US005328776A

United States Patent [19]

Garber et al.

[11] Patent Number: 5,328,776

[45] Date of Patent: Jul. 12, 1994

[54] ABRASION AND IMPACT RESISTANT COMPOSITE CASTINGS AND WEAR RESISTANT SURFACE PROVIDED THEREWITH

[76] Inventors: Michail Garber, 1249 E. 18 St., Brooklyn, N.Y. 11230; Boris Amusin, 40 Ocean Parkway #2D, Brooklyn, N.Y. 11218; Kunsoo Kim, 1018 Palisade Ave. #P6, Fort Lee, N.J. 07024

[21] Appl. No.: 377

[22] Filed: Jan. 4, 1993

[51] Int. Cl.[5] .......... B32B 5/00; B02C 1/02

[52] U.S. Cl. .......... 428/614; 241/291

[58] Field of Search .......... 428/614; 164/108, 110, 164/111; 241/291

[56] References Cited

U.S. PATENT DOCUMENTS

| | | | |
|---|---|---|---|
| 1,926,770 | 9/1933 | Harris et al. | 428/614 |
| 2,155,215 | 4/1939 | Beament | 164/111 |
| 2,357,578 | 9/1944 | Brownback | 428/614 |
| 2,904,418 | 9/1959 | Fahnoe | 164/108 |
| 3,385,683 | 5/1968 | Williams | 428/558 |
| 3,804,386 | 4/1974 | Norman | 241/182 |
| 4,099,988 | 7/1976 | Horiuchi et al. | 428/614 |
| 4,474,861 | 10/1984 | Ecer | 428/614 |
| 4,599,772 | 7/1986 | Graham | 164/111 |
| 5,066,546 | 11/1991 | Materkowski | 428/614 |

FOREIGN PATENT DOCUMENTS

| | | | |
|---|---|---|---|
| 2476514 | 8/1981 | France | 164/110 |
| 54-19256 | 2/1979 | Japan | 241/291 |
| 1274766 | 12/1986 | U.S.S.R. | 241/291 |

*Primary Examiner*—John Zimmerman

*Attorney, Agent, or Firm*—Ilya Zborousky

[57] ABSTRACT

A composite casting for wear resistant surface has a base composed of a ductile material and a plurality of wear resistant elements embedded in the base, wherein the wear resistant elements have rounded sides and are arranged in the base so that they are flush with a surface of the base.

15 Claims, 5 Drawing Sheets

ABRASION AND IMPACT RESISTANT COMPOSITE CASTINGS AND WEAR RESISTANT SURFACE PROVIDED THEREWITH

BACKGROUND OF THE INVENTION

The present invention relates to wear resistant composite castings which must have high degree of wear resistance in combination with high ductility and impact strength. Such material can be used to extend significantly the service life of mining and heavy construction equipment such as bucket wheel excavators, dragline excavators, high capacity haulage trucks, and crushing/milling machines.

Hatfield steel and other similar material are used currently in the industry in order to reduce wear of equipment under impact load. These steels have high ductility and plasticity; however, they have relatively low resistance to abrasive and impact wear which reduces the service life of the equipment. Composite castings are also known to be used for protecting the equipment from wear. They usually consist of wear resistant elements and ductile matrix elements which bind the wear resistant elements. In many instances the use of the composite castings replace the Hatfield steel as well as high wear brittle white chromium irons. Such a replacement usually leads to the increase of the service life of the equipment from 2 to 10 times. However, the known composite castings as well as their composition and manufacturing processes have some disadvantages. They are not sufficiently resistant to high dynamic loads. The elevation of the wear resistant elements above the surface of the composite castings and their sharp edges lead to local failure and crack development in the wear resistant elements. The arrangements of the wear resistant elements in parallel rows at an angle relative to the direction of movement of the material leads to the fact that one of the corners of the castings remains unprotected. As a result, the process of continuous wear or "washing out" of the matrix base of the composite casting takes place with the resulting loss of wear resistant elements. The construction and the method of manufacturing lead to the formation of incipient cracks in the matrix base of the castings during the manufacturing process, which reduce the strength of the castings. Finally, the castings are used in hostile environments, they deteriorate due to their low resistance to corrosion. Some castings and methods of their manufacture are disclosed in U.S. Pat. Nos. 3,804,346 and 3,941,589.

SUMMARY OF THE INVENTION

Accordingly, it is an object of the present invention to provide a wear resistant surface which avoids the disadvantages of the prior art.

In keeping with these objects and with others which will become apparent hereinafter, one feature of the present invention resides, briefly stated, in a composite casting for wear resistant surface which has a ductile matrix base, and a number of wear resistant elements embedded in the matrix base, wherein the wear resistant elements have round sides and are arranged in the base flush with its surface.

In accordance with another feature of the present invention, the wear resistant elements in the central region can have a cross-section which is greater than their end region to create the effect of "beam of equal resistance".

The central wear resistant element can have thickenings in its central region and in its end regions, and can be arranged so that its longitudinal axis coincides with the direction of movement of an abrasive material relative to the composite casting.

The wear resistant elements can be formed as strips which are smoothly bent in the plane of the wear resistant surface. The wear resistant elements can be also formed as parallelograms in the plane of the wear resistant surface.

Furthermore, the wear resistant elements can have cutouts on their working surface, which are spaced from one another by a distance which is a multiple of a minimum longitudinal size of the wear resistant element.

The corners of the composite castings can be protected by the above mentioned wear resistant elements. The wear resistant elements can be mounted in the matrix base in rows which are inclined relative to one another, so that the longitudinal axes of the wear resistant elements intersect one another and form a Chevron shape. Furthermore, the wear resistant elements can be arranged in the composite casting in rows of parallel zigzags with the central wear resistant element. The spaces between the rows or other patterns of the wear resistant elements can be filled with the ductile material of the matrix base.

The composite castings can be composed of corrosion and abrasive resistant elements and a corrosion resistant matrix material.

The present invention also can be applied to curved surfaces of mining and construction equipment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Composite castings in accordance with the present invention have wear resistant elements 1 and a ductile matrix 2 in which they are embedded.

The wear resistant elements protect the working surface of the equipment from abrasive wear, while the ductile matrix retain the wear resistant elements in the casting increasing the impact strength of the wear resistant elements due to dampening and confining effects.

In order to increase the carrying capacity and strength of the wear resistant elements operating in conditions of strong impacts, they have a greater cross-section in the central parts of their lengths (see FIGS. 1 and 2), which were designed to create the effect of "beam of equal resistance". As can be seen from FIG. 1, both the central part and the lower part of the wear resistant element are thicker than the upper part in the cross-section.

Figure 1:
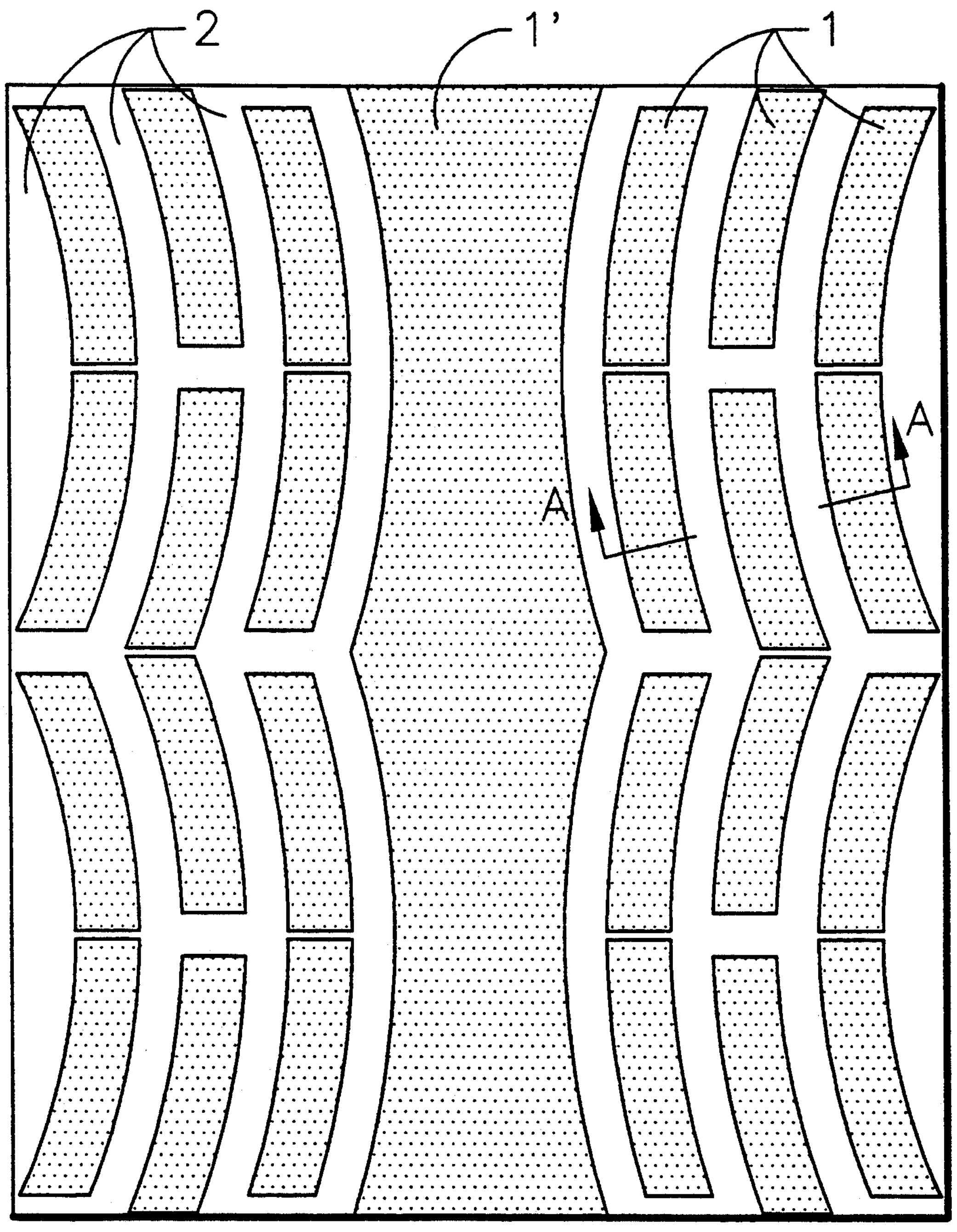
FIG. 1 is a plan view of a composite casting in accordance with the present invention.
Figure 2:
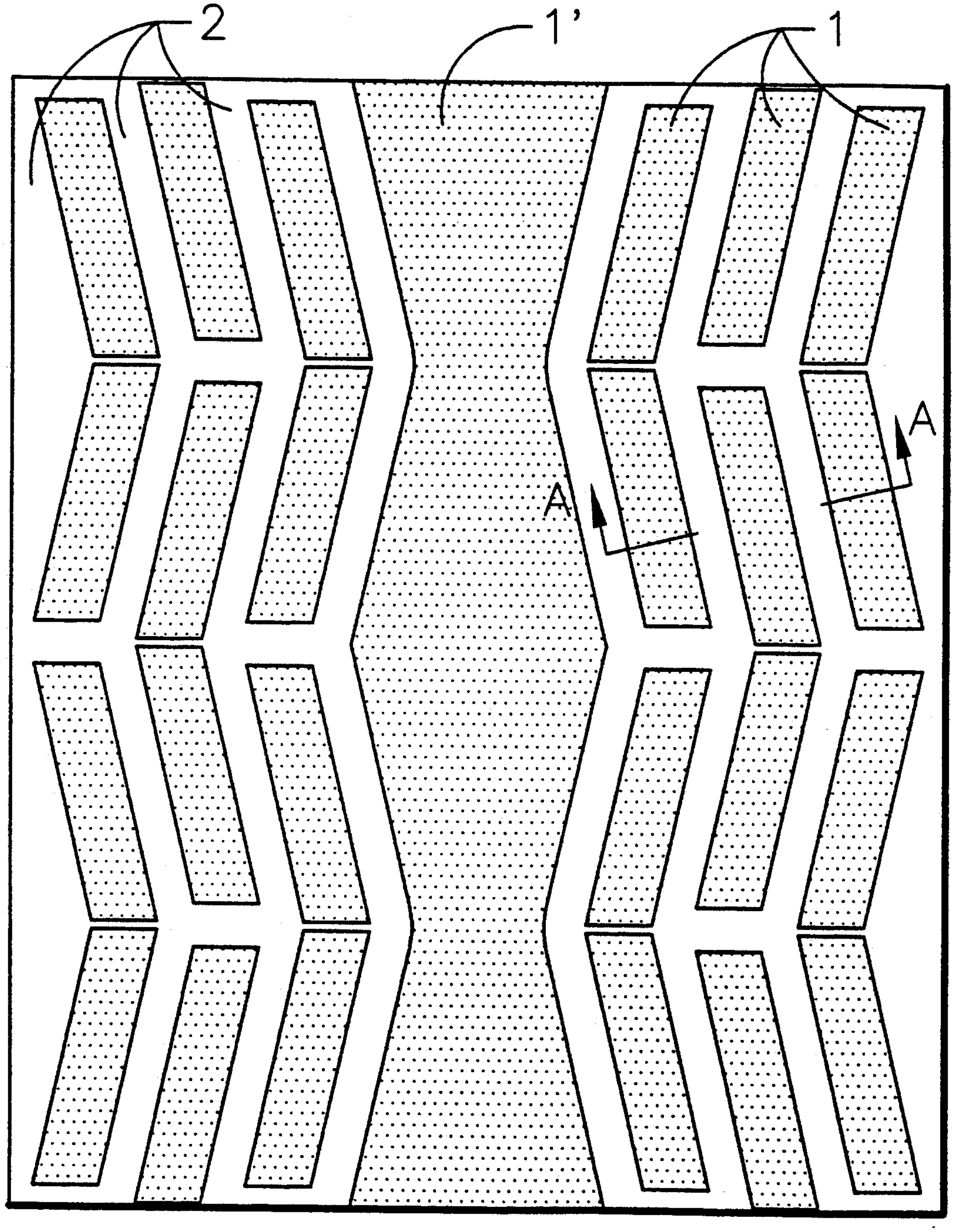
FIG. 2 is a plan view of the zigzag shaped composite castings substantially corresponding to the plan view of FIG. 1, but showing another embodiment of the composite casting of the invention.

As can be seen from FIG. 1, the composite casting has a central wear resistant element 1' which has thickenings in its central region and its end regions to protect the ductile matrix base from wear. Also, the thickening in the central part forms the effect of the "beam of equal resistance". The wear resistant elements 1 are arranged in the ductile matrix base 2, similarly to FIGS. 1, 2. On the plan view, the wear resistant elements can be smoothly bent and arranged in wavy rows one after the other as shown in FIG. 2. The rows of the wear resistant elements 1 are located at both sides of the central wear resistant element 1'. The wear resistant elements 1 have a substantially curved shape.

In the composite casting shown in FIG. 2 the wear resistant element 1' is again arranged in the center of the casting, and the rows of wear resistant elements 1 are located at both sides of the central wear resistant element 1'. Here however the central wear resistant element 1' has straight sides, instead of curved sides of FIG. 1. The wear resistant elements 1 have the shape of parallelograms which are located in a plurality of rows. In each row the parallelograms follow one another and are inclined in opposite directions.

Figure 3A:
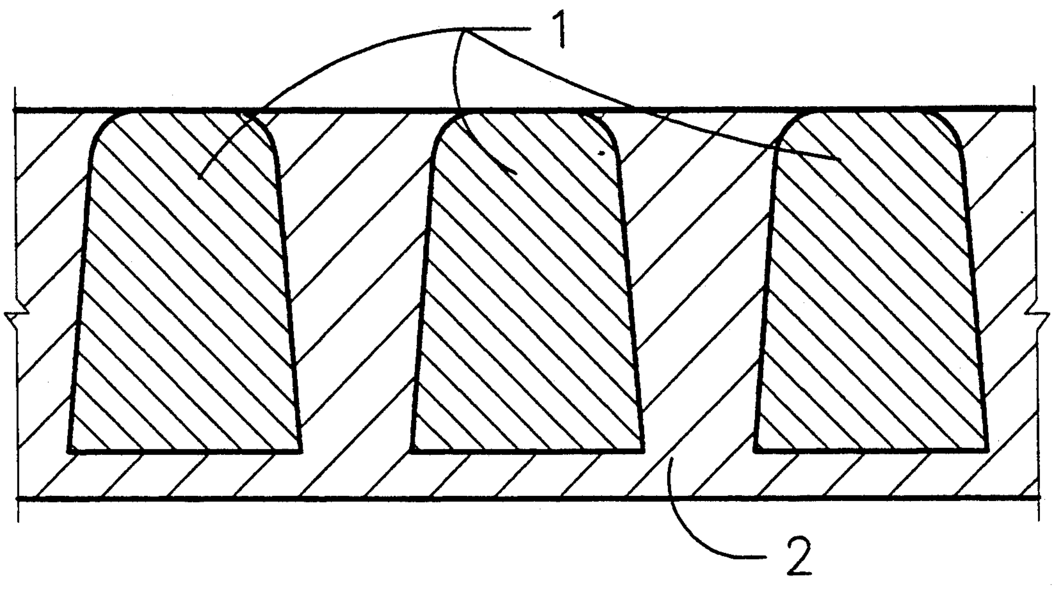
FIGS. 3*a* and 3*b* are views showing a section A—A of FIG. 1 and illustrating two further embodiments of the composite castings of the present invention.
Figure 3B:
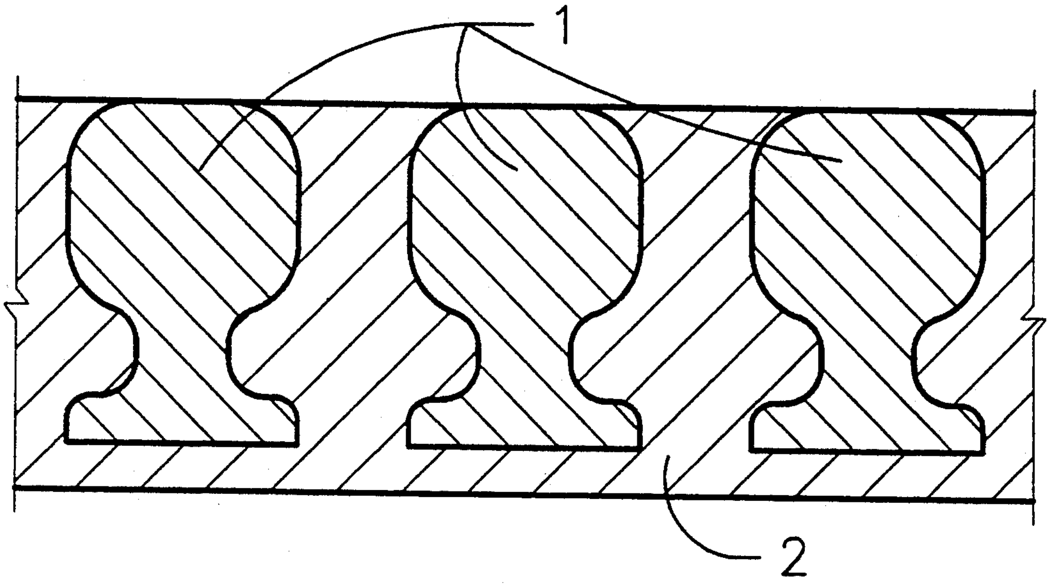

As can be seen from FIGS. 3*a* and 3*b* each wear resistant element has rounded upper corners. Also, in accordance with the present invention, the upper surface of the wear resistant elements 1 and 1' are arranged flush with the upper surface of the base 2 (see FIGS. 3*a* and 3*b*). As shown in FIG. 3*a* the wear resistant elements are trapezoidal with a downwardly increasing cross-section.

In order to increase dampening effect and impact strength of wear resistant elements their cross-section is rail-shaped (see FIG. 3*b*), with an upper head-shaped portion, a lower support portion and an intermediate narrow neck-shaped portion.

Figure 4:
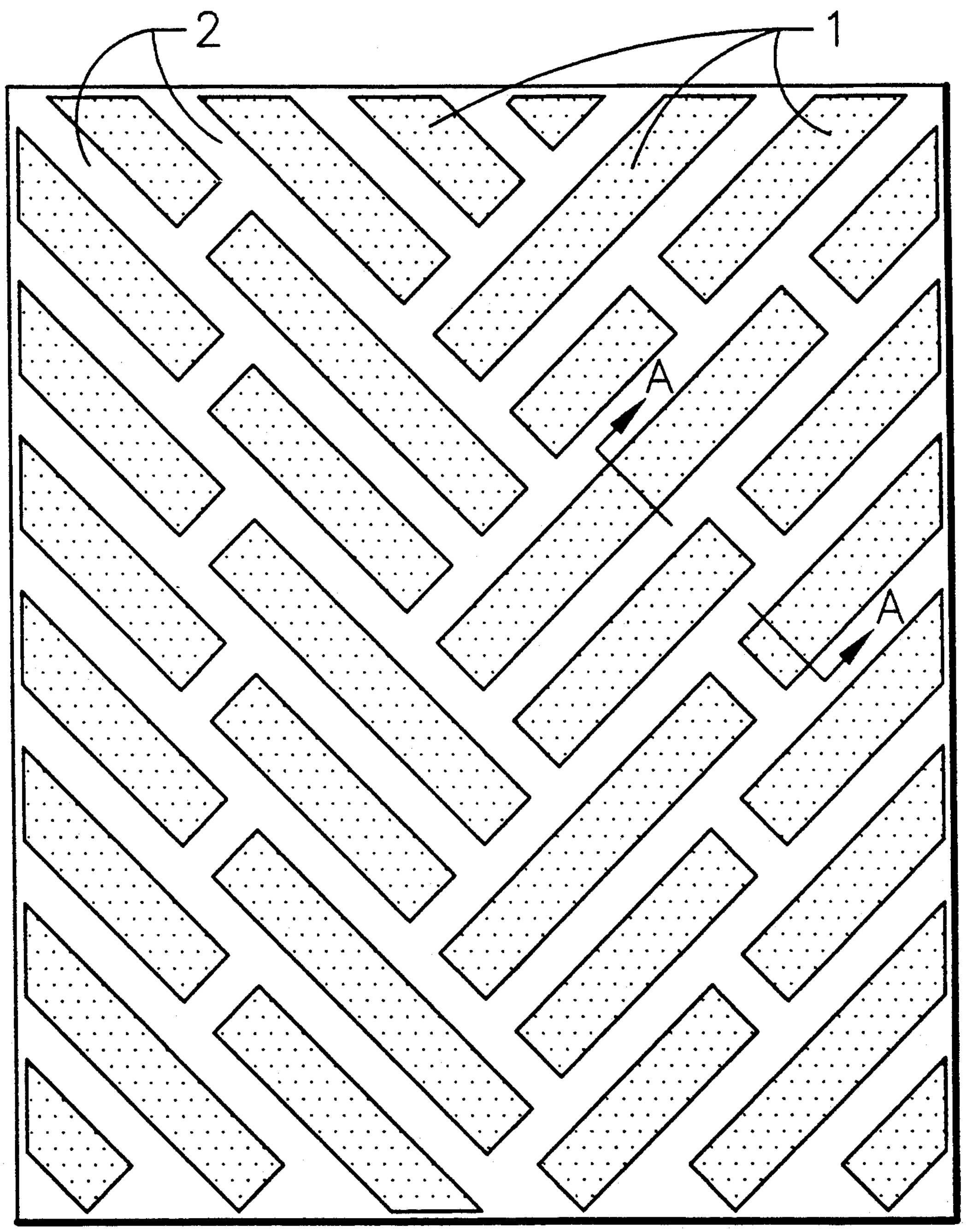
FIG. 4 is a plan view a composite casting in accordance with another embodiment of the present invention.

In the embodiment shown in FIG. 4, the wear resistant elements 1 are arranged in two rows forming a Chevron shape. There is no central wear resistant element. However, the wear resistant elements of at least one row extend laterally beyond the longitudinal axis of the composite casting so that the region near the longitudinal axis is overlapped by the wear resistant elements. The wear resistant elements of FIG. 4 can have the shape of rectangles, parallelograms, etc. The composite castings of FIG. 4 differ from one another only by the shape and location of the wear resistant elements.

As can be seen from all drawings, the corners of the composite castings are protected by the wear resistant elements.

The arrangement of the wear resistant elements shown in FIG. 1 is advantageous for resisting high impact loads by providing a damping effect. Moreover, the use of the smoothly bent, curved wear resistant elements reduces the danger of formation of incipient cracks in the ductile matrix base of the composite casting.

The arrangement of the wear resistant elements of FIG. 2 in form of zigzag is easy to manufacture, since the wear resistant elements are simple, straight elements which can be produced by casting or rolling.

The arrangement of the wear resistant elements in FIG. 4 has the advantage in that it is made from simple elements of a single type. This embodiment can be used in condition of lower impact loads.

In order to produce wear resistant elements, a large-area wear resistant structure is produced and provided with cutouts. Then, the large wear resistant structure can be broken into individual wear resistant elements along the cutouts.

In all shown embodiments the wear resistant elements are arranged with distances therebetween, which distances are filled with the ductile matrix base. Therefore, the strength of the composite casting is increased. It can be seen from the drawings, that the distances between the wear resistant elements are not greater than the width of the wear resistant elements.

An example of the manufacturing process of the inventive composite casting is presented hereinbelow. The casting is formed as a board with the size $10\times10\times1$ inch. The base is composed of a cast steel which has 0.17–0.20 percent carbon, 0.17–0.37 percent silicon, 0.35–0.65 percent manganese, and not more than 0.045 percent sulfur and 0.04 percent phosphorus. The wear resistant elements are composed of white iron including 2.6–3.0 percent carbon, 17.0–21.0 chromium, 2.5–3.0 percent manganese, 0.4–0.8 percent silicon. The wear resistant elements are made by stack casting in accordance with a green sand casting process. After casting, cooling and cleaning the long rods are broken along the cutouts to form the wear resistant elements of a required length. In the green sand casting in accordance with the patterns, the recesses for the composite boards are produced. The wear resistant elements are arranged in the lower casting mold in accordance with the templates and symbols, the mold is assembled and then liquid steel is filled at a temperature of 2,758° F. After cooling and expelling, the castings are cleaned and cut off. The composite plates are thermally treated by heating to 1,731°–1,767° F. during 1.5 hour and then cooled in air. Thus, in the composite casting produced in this manner, the wear resistant surface has a plurality of curved elongated wear resistant elements which are spaced from one another in a transverse direction by distances and subdivided into a longitudinal direction by cutouts, so that both the transverse distances between the elongated wear resistant elements and the cutouts extending transversely inside the wear resistant elements are filled with the ductile matrix base. Therefore, the strength of the composite casting is further increased.

The steel is melted in arc-electric furnaces. White wear resistant iron is cast in induction furnaces. Electric furnaces of all types may be used for melting steel and white wear resistant iron.

The composite plates are mounted on areas of mining equipments which are subjected to intensive wear. The example is a part of the truck compartment. The plates are welded by electric welding along the contour of the plate by a seam with height equal to 0.2–0.27 inch. Since the plate has a thickness of about 1 inch, it provides the screening effect with respect to the seam and protects it from wear.

The composite castings can be used, in accordance with another example, for wear protection of buckets of dredges. The composite boards are mounted on the outer side of the bottom of the bucket and also on its rear side and attached to the bucket by electric welding. During the operation of the dredges when the rock is excavated, the bottom of the bucket is strongly rubbed against the rock. The arrangement of the composite plates having a high wear resistance substantially reduce the wear of the bottom and increase its service life 5–10 times.

It will be understood that each of the elements described above, or two or more together, may also find a useful application in other types of constructions differing from the types described above.

While the invention has been illustrated and described as embodied in composite castings and a wear resistant surface provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A composite casting for wear resistant surface comprising a base composed of a ductile material; and a plurality of wear resistant elements embedded in said base, said wear resistant elements having rounded sides and are arranged in said base so that they are flush with a surface of said base, said wear resistant elements including a central wear resistant element which has a thickening provided in its central region and also in its end regions, said central wear resistant element having a longitudinal axis extending in direction of movement of an abrasive material along the composite casting.

2. A composite casting for wear resistant surface, comprising a base composed of a ductile material; and a plurality of substantially curved elongated wear resistant elements embedded in said base, said elongated wear resistant elements being spaced from one another in a transverse direction by distances and being interrupted in a longitudinal direction by transverse cutouts so that the ductile material of said base fills said distances between said elongated wear resistant elements and also fills said cuts in said elongated wear resistant elements.

3. A composite casting as defined in claim 2, wherein said distances between said wear resistant elements are not greater than a width of said wear resistant elements.

4. A composite casting as defined in claim 2, wherein said transverse cutout of a preceding one of said wear resistant elements is followed by an uncut portion in a subsequent one of said wear resistant elements and said uncut portion is a plurality of times wider than said transverse cutout.

5. A composite casting as defined in claim 2, wherein at least some of said wear resistant elements are integral and have a central region which has a greater cross-section than an end region of said some wear resistant elements.

6. A composite casting as defined in claim 1, wherein some of said wear resistant elements are formed as a strip which is gradually bent in a plane of the composite casting.

7. A composite casting as defined in claim 2, wherein at least some of said wear resistant elements are formed as a parallelogram in a plane of the composite casting.

8. A composite casting as defined in claim 2, wherein said cutouts of said wear resistant elements are spaced from one another by a distance which is a multiple of a transverse size of said wear resistant element.

9. A composite casting as defined in claim 2, wherein said base has corner regions, said wear resistant elements include at least some wear resistant elements arranged in said corners.

10. A composite casting as defined in claim 2, wherein said wear resistant elements are arranged so that their longitudinal axes intersect with one another forming a Chevron shape.

11. A composite casting as defined in claim 2, wherein said wear resistant elements are arranged in zigzag rows extending at both sides of a central longitudinal axis of said base.

12. A composite casting as defined in claim 2, wherein said wear resistant elements include a central wear resistant element extending in direction of the central longitudinal axis of said base, and at least two rows of other wear resistant elements arranged at both sides of said central wear resistant element.

13. A composite casting as defined in claim 2, wherein said wear resistant elements are spaced from one another by distances, said base filling said distances between said wear resistant elements.

14. A composite casting as defined in claim 2, wherein said wear resistant elements are composed of wear resistant and corrosion resistant material.

15. A composite casting as defined in claim 2, wherein said wear resistant elements have a rail-shaped cross-section with a rounded head-shaped upper portion, a lower support portion, and an intermediate narrow neck-shaped portion to withstand strong impact.

* * * * *